Jan. 18, 1949.    J. L. McFARLAND ET AL    2,459,174
PROBE
Filed March 1, 1945

*INVENTORS*
JOSEPH L. McFARLAND
MARGUERITE P. VAN CAMP
BY
*William D. Hall*
ATTORNEY Patented Jan. 18, 1949

2,459,174

UNITED STATES PATENT OFFICE 2,459,174

PROBE

Joseph L. McFarland, Royal Oak, and Marguerite P. Van Camp, Detroit, Mich.

Application March 1, 1945, Serial No. 580,454

3 Claims. (Cl. 175—183)

(Granted under the act of March 3, 1883, as amended April 30, 1928; 370 O. G. 757)

The invention described herein may be manufactured and used by or for the Government for governmental purposes, without the payment to us of any royalty thereon.

The invention to be hereinafter described relates to a coil for an electric probe for use in the location and isolation of interference in electrical and radio apparatus.

In our former application Ser. No. 561,798, filed November 3, 1944, and now pending, the following objects, all equally applicable to this invention, are stated: To spot zones of radio-frequency interference in and about radio interference generating apparatus; to provide a probe having multi-directional characteristics that make it unnecessary to rotate the probe in order to locate various sources of radio frequency interference; to provide a probe of improved sensitivity that is concentrated in a small, compact and slender construction that permits its insertion into small recesses that have been inaccessible to commercial probes that have been available heretofore; to provide a probe of improved simplicity in construction and in mode of operation, permitting its use by non-technical personnel, and that is simple of assembly so that it may be manufactured rapidly and inexpensively with a minimum of apparatus, operation and expense; to supply a probe that is provided with an insulating sleeve that protects it against undue damage, wear and fouling by metal particles, moisture, dirt and the like, and that eliminates the possibilities of shorting pieces of electrical apparatus which may be contacted by it and which prevents the creation of undue static discharges should the probe contact any metal object; and to provide a probe which may be easily and definitely set at a given distance from a given point and positively maintained at that distance.

In addition to the above objects common alike to the invention of our said pending application and to the invention of this application, further objects of the invention of the present application are: To further materially reduce the number of parts in the probe, thereby further simplifying the construction and correspondingly reducing the cost and time of manufacture; to further materially reduce the size, especially the length, of the operative or sensitive portion of the probe; to enable placing a greater length of probe wire within a smaller space; to provide a firm support for the probe wire approximately throughout its entire length; and to provide a probe having uniformly directional characteristics.

In order to more clearly disclose the construction, operation and use of the invention, reference should be had to the accompanying drawings forming part of the present application. Throughout the several figures of the drawings like reference characters designate the same parts in the different views.

First will be given, briefly, a statement of the parts and construction which are substantially the same in both our above pending application and in this invention. That will be followed by the detailed description of the present invention and reference to the elimination from or changes in the construction of the pending application.

Figure 1:
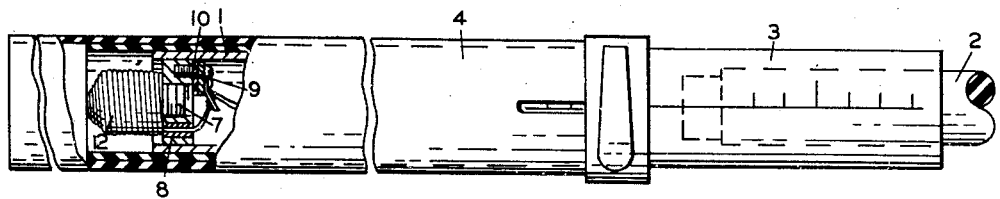
Fig. 1 is a side elevation, assembled, partly broken away.

A non-magnetic tubular probe barrel 1 is detachably secured at one end to one end of a transmission cable 2 (preferably of the two-wire coaxial cable, or "Twin-ax," type), the opposite end being connected in well known manner to any acceptable indicating equipment. For suitable connection between the cable 2 and the probe barrel 1, the said barrel may be of a diameter to allow the said cable to be slid into one end of it (Figure 1), and a secure connection may be obtained by setscrews (not shown) extending radially through the walls of said barrel and bearing against said cable. Removably mounted on this probe barrel 1, in any suitable manner, may be disposed a graduated tubular sleeve 3 of Bakelite or like material adapted to be used, in cooperation with the housing 4 of like material, as a distance gauge. Housing 4 has one closed end adapted to be rested against a noise source and is provided with a clamp near its open end to bind it in position along the sleeve 3, when the gauge is to be used. The probe may be used either with or without the sleeve 3, as will be well understood. For further details of the construction common to this invention and to application Ser. No. 561,798 reference is hereby directed to said application.

Figure 2:
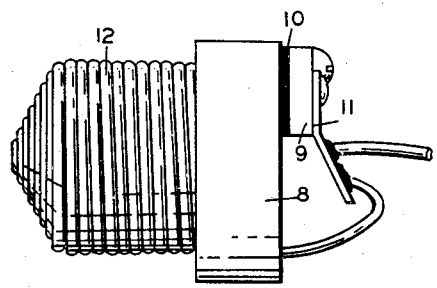
Fig. 2 is an enlarged side elevation of the coil and its support.
Figure 3:
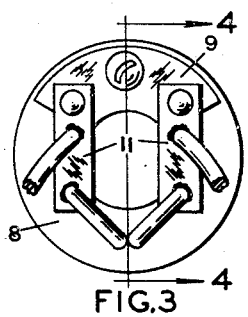
Fig. 3 is an end elevation of Fig. 2, from the cable side.
Figure 4:
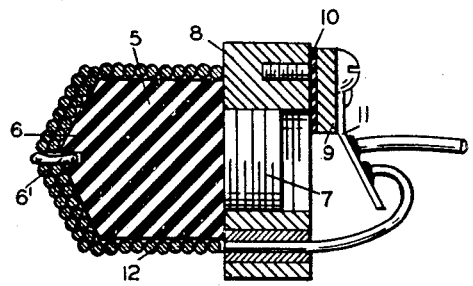
Fig. 4 is a central, longitudinal cross section through the coil and its support, on line 4—4 of Fig. 3.

The invention of this application resides primarily in the operative or sensitive element of the probe. It is shown in detail in Figs. 2, 3 and 4 and, in assembled relation, in the broken away portion in Fig. 1. In this invention, a single probe wire 12 is used, as may be used in the invention of our pending application but the construction, arrangement, mounting and disposition of it are entirely different.

In the preferred construction, a relatively small diameter cylindrical thimble-like stub 5, of any high frequency insulating material, is used as a probe wire support. At one end it terminates in a shallow cone 6, or a cone having a base of great diameter compared to the cone height, the tip of the cone being provided with a recess 6' concentric with the axis of the cone 6 and stub 5. This recess 6' or socket may extend from cone tip to cone base plane. Preferably it is greater in one direction than in a direction perpendicular thereto—i. e. in one direction it has a dimension approximately that of the diameter of the probe wire 12, whereas, in the direction perpendicular thereto it has a dimension approximately twice that, all for a purpose to be later disclosed. The opposite end 7 of stub 5 is, preferably, reduced in diameter, and screw threaded for ready, compact and secure connection to, and disconnection from, a cylindrical base 8 of brass, copper, or like material which is mounted in any suitable manner in the end of probe barrel 1. Base 8 carries an arcuate terminal lug base 9 electrically separated therefrom by a similarly shaped insulator 10. Terminal lug base 9, in turn, carries two terminal lugs 11 to which the ends of the coaxial cable wires are suitably secured.

In building the sensitive element of the probe, the insulated probe wire 12 is folded upon itself approximately midway of its length, the fold being close and flat so that the branches will be parallel throughout. The tip of the fold is threaded into the recess 6' and the wire 12 is then bent sharply down across the incline of the cone 6, the part in the recess 6' acting as an anchor. The wire 12 is then wound spirally and closely about that point as a center across the conical surface to the outer edge thereof, forming a coil on which the turns are very close, separated only by the insulation on the wire. Throughout the conical surface the two strands of wire will lie one above the other so that there will be two spiral layers. However, as the two strands of the wire 12 reach the cylindrical face of the stub 5 the two layers, in depth, will become one as the two strands retain their same relative positions and are wound in a helix. By this winding on a support of relatively small diameter, a very great increase in the effective length of the probe wire 12 results while at the same time a great reduction in space required for the probe wire is possible. This reduction in space and great increase in effective length of probe wire produces greatly increased efficiency in the resulting probe. In addition to the above gains, there is the gain of a very solid and substantial support for the probe wire by the stub 5. In fact, a coil formed in this way is substantially self sustaining.

In assembled relation, the last turn will bear directly on the base 8, the two free ends being threaded through a small insulated hole in the base, separated and secured in well known manner to the respective terminal lugs 11 carried by base 9. This, of course, definitely establishes electrical connection with the coaxial cable 2.

It is thought that the construction, operation and use of the invention will be clear from the preceding detailed description.

Changes may be made in the construction, arrangement and disposition of the several parts of the invention within the scope of the appended claims without departing from the field of the invention and it is meant to include all such within this application wherein only one preferred form has been illustrated purely by way of example and with no thought or intention of, in any degree, limiting the invention thereby.

Having thus described our invention, what we claim and desire to protect by Letters Patent is:

1. A sensitive element for a probe comprising a stub of dielectric material having the shape of a cylinder, provided at one end with a shallow conical surface, an anchoring means at the apex of said conical surface, a probe wire folded in half so as to form two parallel branches wound into a coil so as to form a double spiral layer covering the conical surface of said stub and a single helical layer covering its cylindrical surface, the fold of said wire being anchored by the anchoring means.

2. A probe comprising a transmission cable provided with two shielded conductors; a sensitive element comprising a stub of dielectric material having the shape of a cylinder, provided at one end with a shallow conical surface, an anchoring means at the apex of said conical surface, a probe wire folded in half so as to form two parallel branches wound into a coil so as to form a double spiral layer covering the conical surface of said stub and a single helical layer covering its cylindrical surface, the fold of said wire being anchored by the anchoring means; and electrical connections between the two conductors of the transmission cable and the two ends of the probe wire.

3. A probe as defined in claim 2, including a tubular barrel of conducting nonmagnetic material interposed between the transmission cable and the sensitive element aforesaid and acting as a shield for the electrical connections aforesaid.

JOSEPH L. McFARLAND.
MARGUERITE P. VAN CAMP.

REFERENCES CITED

The following references are of record in the file of this patent:

UNITED STATES PATENTS

| Number | Name | Date |
| --- | --- | --- |
| 1,765,958 | Wick | June 24, 1930 |
| 2,103,179 | Rennau | Dec. 21, 1937 |
| 2,109,189 | Bly | Feb. 22, 1938 |
| 2,179,257 | Goloviznin | Apr. 13, 1938 |
| 2,249,166 | Parker et al. | July 15, 1941 |
| 2,351,604 | Ferrill | June 20, 1944 |